United States Patent
Ueno

(10) Patent No.: US 8,494,734 B2
(45) Date of Patent: Jul. 23, 2013

(54) SHIFTING CONTROL DEVICE FOR VEHICLE

(75) Inventor: Koki Ueno, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 59 days.

(21) Appl. No.: 13/257,638

(22) PCT Filed: Mar. 3, 2010

(86) PCT No.: PCT/JP2010/053934
§ 371 (c)(1),
(2), (4) Date: Sep. 20, 2011

(87) PCT Pub. No.: WO2010/110057
PCT Pub. Date: Sep. 30, 2010

(65) Prior Publication Data
US 2012/0022754 A1 Jan. 26, 2012

(30) Foreign Application Priority Data
Mar. 25, 2009 (JP) ................. 2009-073412

(51) Int. Cl.
*G06F 7/00* (2006.01)
(52) U.S. Cl.
USPC ............................................. 701/58; 701/93
(58) Field of Classification Search
USPC ....................................................... 701/58, 93
See application file for complete search history.

(56) References Cited

U.S. PATENT DOCUMENTS

| 7,572,203 | B2 * | 8/2009 | Kashiwagi et al. | ............. | 477/34 |
| 2002/0084162 | A1 | 7/2002 | Schafer et al. | | |

FOREIGN PATENT DOCUMENTS

| DE | 100 52 259 | 5/2002 |
| DE | 10 2004 039 467 A1 | 2/2006 |
| EP | 1 031 487 A2 | 8/2000 |
| EP | 1 103 744 A2 | 5/2001 |

(Continued)

OTHER PUBLICATIONS

Notification of Reason for Rejection issued by Japanese Patent Office in JP 2009-073412, mailed May 22, 2012.
International Search Report in International Application No. PCT/JP2010/053934; Mailing Date: May 11, 2010.
Written Opinion of the International Searching Authority in International Application No. PCT/JP2010/053934; Mailing Date: May 11, 2010.

*Primary Examiner* — Thomas Black
*Assistant Examiner* — Luke Huynh
(74) *Attorney, Agent, or Firm* — Finnegan, Henderson, Farabow, Garrett & Dunner, LLP

(57) ABSTRACT

It is provided a shifting control device for vehicle for electrically controlling a switching of a transmission to a parking range for performing a parking lock in response to an operation by a driver, the shifting control device for vehicle configured to determine the switching to the parking range when the driver performs a predetermined operation for switching to the parking range, based on whether plural vehicle speed signals different in response relative to an actual vehicle speed satisfy a predetermined condition; and the switching to the parking range being determined (i) using a corrected value obtained by correcting a vehicle speed signal having a slower response such that a difference in a vehicle speed based on the vehicle speed signal having the slower response and a vehicle speed signal having a quicker response is suppressed, or (ii) using a corrected value obtained by correcting a predetermined vehicle-speed threshold value associated with the vehicle speed signal having the quicker response such that the slower the response of the vehicle signal having a slower response is, the larger is the corrected value than the corrected value associated with the vehicle speed signal having the quicker response.

20 Claims, 8 Drawing Sheets

FOREIGN PATENT DOCUMENTS

| | | |
|---|---|---|
| JP | 59-97327 | 6/1984 |
| JP | 5-280637 | 10/1993 |
| JP | 2001-153225 | 6/2001 |
| JP | 2007-264884 | 10/2007 |
| JP | 2008-116002 | 5/2008 |
| JP | 2008-291895 | 12/2008 |

* cited by examiner

| SHIFT POSITION | POSITION "N" | POSITION "R" | POSITION "D" | POSITION "M" | POSITION "B" |
|---|---|---|---|---|---|
| DETECTION SIGNAL VOLTAGE $V_{SF}$ OF SHIFT SENSOR | mid | high | low | mid | low |
| DETECTION SIGNAL VOLTAGE $V_{SL}$ OF SELECT SENSOR | high | high | high | low | low |

SHIFTING CONTROL DEVICE FOR VEHICLE

CROSS-REFERENCE TO RELATED APPLICATIONS

This application is a national phase application of International Application No. PCT/JP2010/053934, filed Mar. 3, 2010, and claims the priority of Japanese Application No. 2009-073412, filed Mar. 25, 2009, the contents of both of which are incorporated herein by reference.

FIELD OF THE INVENTION

The present invention relates to a shifting control device for vehicle for performing parking lock in response to an operation of a driver, and more particularly, to a shift-by-wire technology for electrically controlling a switching to a parking range of a transmission to perform a parking lock.

DESCRIPTION OF THE RELATED ART

A shifting control device for vehicle has heretofore been known with an arrangement adopting a so-called shift-by-wire (SBW) system for electrically controlling the switching to a parking range of a transmission to perform a parking lock in response to an operation by a driver. More particular, the shifting control device for vehicle, if a shift range of the transmission determined in response to the operation of the driver, belongs to a parking range (a P-range or a Parking range), outputs a control signal to a parking lock device for mechanically blocking the rotations of drive wheels to operate the parking lock device, whereby the parking lock is performed to block the rotations of the drive wheels. For example, a parking lock device for an automatic transmission disclosed in Patent Publication 1 (Japanese Patent Publication No. 2001-153225) represents such a parking lock device.

Patent Publication 1 discloses the parking lock device wherein when the driver performs a parking-range selecting operation in the presence of a vehicle speed, an automatic brake is activated to decelerate a vehicle until the vehicle speed reaches a vehicle-halt determining preset vehicle speed. Subsequently, after the vehicle speed reaches the vehicle-halt determining preset vehicle speed, a parking lock mechanism is activated by a park lock actuator to accomplish a parking lock condition. Further, there has heretofore been known a collision determining device disclosed in Patent Publication 2 (Japanese Patent Publication No. 2007-264884).

DISCLOSURE OF THE INVENTION

Meanwhile, for determining a halt of a vehicle using different vehicle speed signals of more than two different systems for a predetermined condition for performing the parking lock, a plurality of vehicle speed signals different in response relative to an actual vehicle speed (hereinafter referred to as "actual vehicle speed") are used. When both the vehicle speed signals of two systems different in response becomes less than for instance a predetermined vehicle speed (such as, for instance, a parking-lock allowable vehicle speed), the parking lock is likely performed by a shift-by-wire in response to a parking lock demand. In such a case, on a deceleration of the vehicle, a vehicle speed signal having a slower response relative to the actual vehicle speed of the vehicle speed signals of the two systems is used, for determining as to whether the vehicle is halted, and then executing the parking lock.

Then, in comparison to a case where upon receipt of the parking lock demand appearing immediately after for instance the vehicle is decelerated and halted, and the vehicle halted is determined using only the vehicle speed signal having quicker response, a determination is apt to be easily made that the actual vehicle speed exceeds a predetermined vehicle speed. Such a determination occurs due to the slower response to a drop of a vehicle speed (i.e., slower following response relative to a drop in actual vehicle speed), despite the actual vehicle speed being smaller than a predetermined vehicle speed. Thus, there is an increasing probability in which the parking lock is not executed in response to the parking lock demand. In other words, in the end of deceleration, since the vehicle halted is determined based on the vehicle speed signal with slower response, there is an increasing probability that determination of the vehicle halt with increased precision using the vehicle speed signal with quicker response is not utilized. Meanwhile, such a subject described above has been unknown.

The present invention has been completed with the above view in mind, and has an object to provide a shifting control device for vehicle, in an electrical switching control for switching a transmission to a parking range to perform a parking lock in response to an operation of a driver, which can, with utilizing a determination for switching to the parking range with increased precision using a vehicle speed signal with quicker response, suppress a difficulty in executing the parking lock in response to the parking lock demand due to usage of a vehicle speed signal with slower response.

For achieving an above object, a first aspect of the present invention provides a shifting control device for vehicle for electrically controlling a switching of a transmission to a parking range for performing a parking lock in response to an operation by a driver. The shifting control device for vehicle determines the switching to the parking range when the driver performs a predetermined operation for switching to the parking range, based on whether plural vehicle speed signals different in response relative to an actual vehicle speed satisfy a predetermined condition. The switching to the parking range is determined (i) using a corrected value obtained by correcting a vehicle speed signal having a slower response such that a difference in a vehicle speed based on the vehicle speed signal having the slower response and a vehicle speed signal having a quicker response is suppressed, or (ii) using a corrected value obtained by correcting a predetermined vehicle-speed threshold value associated with the vehicle speed signal having the quicker response such that the slower the response of the vehicle signal having a slower response is, the larger is the corrected value than the corrected value associated with the vehicle speed signal having the quicker response.

With such a structure, the vehicle speed signal having the slower response is corrected such that a difference in vehicle speed based on the vehicle speed signal having the slower response and the vehicle speed signal having the quicker response, or the predetermined threshold value associated with the vehicle speed signal having the quicker response is corrected such that the slower the response of the vehicle signal having a slower response is, the larger will be the corrected value than the corrected value associated with the vehicle speed signal having the quicker response.

Therefore, as to whether the vehicle speed signal having the slower response satisfies a predetermined condition is determined considering the correction, while as to whether the vehicle speed signal having the quicker response satisfies the predetermined condition is determined by value as it is. Thus, easiness with the vehicle speed signal having the slower response for satisfying the predetermined condition is close to easiness with the vehicle speed signal having the quicker response for satisfying the predetermined condition, or exceeds it. Accordingly, in an electrical switching control for switching a transmission to a parking range to perform a parking lock in response to an operation of a driver, a difficulty in executing the parking lock in response to the parking lock demand due to usage of a vehicle speed signal with slower response can be suppressed. In addition, a determination for switching to the parking range with increased precision using a vehicle speed signal with quicker response can be utilized.

More preferably, the corrected value is determined, based on a delay component in response of the vehicle speed signal having the slower response relative to the actual vehicle speed, such that the slower the response of the vehicle speed signal having the slower response is, the more easily the predetermined condition is satisfied than the vehicle speed signal having the quicker response. An effect for switching determination to the parking range with increased precision by the vehicle speed signal having the quicker response can be utilized. That is, the switching to the parking range can be determined at a speed closer to the actual vehicle speed.

More preferably, the corrected amounts by the corrections are made larger for a larger deceleration of a vehicle in comparison to a smaller deceleration of the vehicle. Thus, a delay in response of the vehicle speed signal having the slower response relative to the actual vehicle speed which becomes larger as the deceleration, can be appropriately corrected, so that the switching to the parking range can be easily determined at a vehicle speed closer to the actual vehicle speed, regardless magnitude of the vehicle deceleration.

More preferably, when the vehicle speed signal having the quicker response is abnormal, the switching to the parking range is determined with suppressing the corrected amounts by the corrections and without using the abnormal vehicle speed signal. With such an operation, there is an increasing probability that the parking lock cannot be executed in response to the parking lock demand during deceleration. However, a determination for switching to the parking range even upon no actual vehicle speed satisfying the predetermined condition, can be avoided.

More preferably, when the vehicle speed signal having the quicker response is abnormal, the switching to the parking range is determined without performing the corrections and without using the abnormal vehicle speed signal. With such an operation, there is an increasing probability that the parking lock cannot be executed in response to the parking lock demand during deceleration. However, a determination for switching to the parking range even upon no actual vehicle speed satisfying the predetermined condition, can be avoided.

Further, for achieving the above object, a second aspect of the present invention provides a shifting control device for vehicle for electrically controlling a switching of a transmission to a parking range for performing a parking lock in response to an operation by a driver. The shifting control device for vehicle determines, when the driver performs a predetermined operation for switching to the parking range, the switching to the parking range based on whether a vehicle speed signal satisfies a predetermined condition. The switching to the parking range is determined, of a plurality of vehicle speed signals different in response, based on only the vehicle speed signal having the quicker response when the vehicle speed signal having the quicker response is normal, whereas based on only the vehicle speed signal having the slower response in comparison to the vehicle speed signal having the quicker response when the vehicle speed signal having the quicker response is abnormal. With such a determination, the switching to the parking range is determined, based on only the vehicle speed signal having the quicker response when the vehicle speed signal having the quicker response is normal, whereas based on only the vehicle speed signal having the slower response in comparison to the vehicle speed signal having the quicker response when the vehicle speed signal having the quicker response is abnormal. Accordingly, during an electric switching control to the parking range in the transmission to execute the parking lock in response to the operation of the driver, the switching determination to the parking range with increased precision is surely utilized by using the vehicle speed signal having the quicker response. In addition, by using the vehicle speed signal having the slower response upon a failure in the vehicle speed signal having the quicker response, the occurrence of a difficulty of executing the parking lock in response to the parking lock demand is suppressed.

More preferably, one of the vehicle speed signals is based on a pulse signal obtained by converting a vehicle-speed correlation value detected by a rotation speed sensor. With such an arrangement, the vehicle speed signal having the slower response relative to the actual vehicle speed can be used in determining for switching to the parking range.

More preferably, the vehicle speed signals are based on vehicle-speed correlation values detected by different rotation speed sensors. Such an arrangement increases reliability.

More preferably, the predetermined condition is a determining condition for determining whether a vehicle is halted based on the vehicle speed signals, and on performing the predetermined operation for switching to the parking range of the driver, if the predetermined condition is satisfied with the vehicle speed signals falling not more than or being less than the predetermined vehicle-speed threshold value, the switching to the parking range is determined. With such a determination, the parking lock can be appropriately executed in response to the parking lock demand.

More preferably, the shifting control device for vehicle further includes a function to execute switching from a shift range other than the parking range to the parking range and to turn off a vehicle power source, in response to the operation by the driver for switching the vehicle power source from a turn-on state to a turn-off state, and the predetermined operation performed by the driver for switching to the parking range is an operation for switching the vehicle power source from the turn-on state to the turn-off state. With such an operation, performing such a correction increases the chance for switching to the parking range associating with the operation executed to switch the vehicle power source from the turn-on state to the turn-off state.

More preferably, the switching of the shift range of the transmission is electrically controlled based on a positional signal about an operated position of a shift operation device, and the predetermined operation performed by the driver for switching to the parking range is an operation of the shift operation device to switch to the operated position for switching the shift range to the parking range in the transmission. With such an operation, performing the correction increases the chance of switching the shift range to the parking range associating with the operation of the shift operation device to the operated position for switching the shift range to the parking range in the transmission.

More preferably, further, the transmission may have structures of either one of structures described below. Firstly, the transmission may be a variety of planetary-gear type multi-step transmissions with for instance a forward drive four-speed gear positions, a forward drive five-speed gear positions, a forward drive six-speed gear positions and more gear positions. In these transmissions, rotary elements of plural sets of planetary gear devices are selectively coupled by engagement devices such that a plurality of gear positions (shift positions) is alternately established. The transmission may further be a synchronous mesh-type parallel two-shaft transmission including plural pairs of constant-mesh type change gears mounted on two shafts, in which either one of the plural pairs of change gears is alternately brought into a power transmitting state by the action of a synchronous device. The synchronous mesh-type parallel two-shaft transmission may include a hydraulic actuator to drive the synchronous device such that gear positions are automatically switched. The transmission may further include a so-called belt-drive type continuously variable transmission having a power transmitting belt serving as a power transmitting member, which is wound in tension between a pair of variable pulleys having variable effective diameters to vary speed ratios in a continuously variable fashion.

Secondly, the transmission may be a so-called traction type continuously variable transmission having a pair of cones arranged to rotate about a common axis, and plural pieces of rollers operative to rotate about a center of rotation intersecting the common axis. The rollers are pinched between the pair of cones, and an intersecting angle between the center of rotation of the rollers and the common axis is varied to vary the speed ratios.

Thirdly, the transmission may be an automatic transmission including a differential mechanism structured of for instance a planetary gear unit arranged to distribute a drive power from an engine to a first electric motor and an output shaft, a second electric motor mounted on the differential mechanism at an output shaft thereof. With such an automatic transmission, the differential mechanism has a differential action which mechanically transmits a main part of the drive power of the engine to drive wheels. The rest of the drive power from the engine is electrically transmitted through the first electric motor to a second electric motor in an electrical path, thereby electrically varying the speed ratios. In another alternative, the transmission may be an automatic transmission including an electric motor capable of transmitting a drive power to an engine shaft and an output shaft, which is installed on a so-called parallel shaft type hybrid vehicle.

More preferably, the drive force source of the vehicle may include engines widely in use such as internal combustion engines like a gasoline engine and a diesel engine, etc. As the auxiliary power force source, an electric motor can be added to the engine. Alternatively, as the power force source for running, only the electric motor can be used.

DETAILED DESCRIPTION OF THE PREFERRED EMBODIMENTS

Now, various embodiments according to the present invention will be described below in detail with reference to the accompanying drawings.

Embodiment 1

Figure 1:
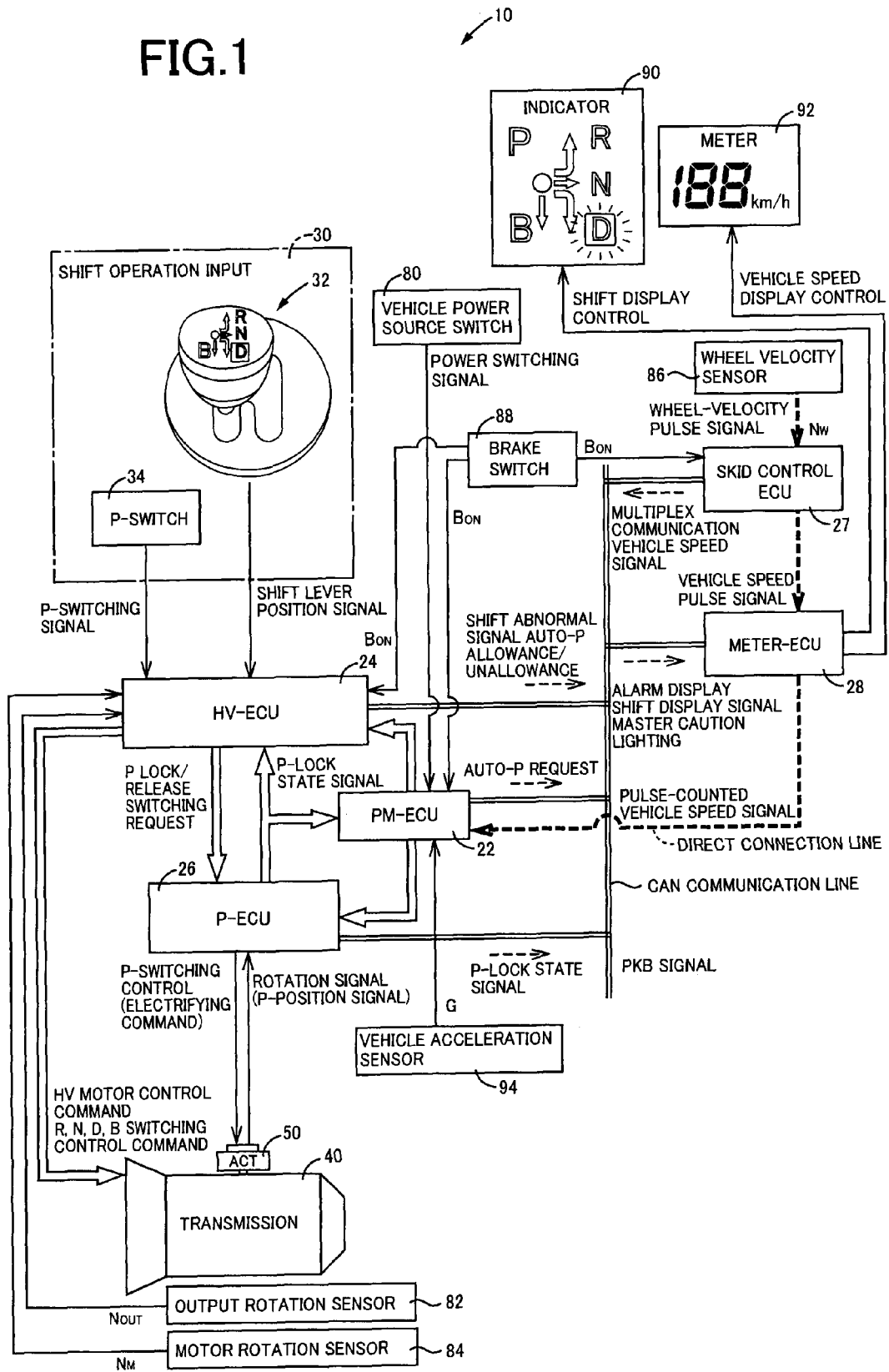
FIG. 1 is a view illustrating an outline structure of a shifting control device for vehicle to which the present invention is applied.

FIG. 1 is a view illustrating an outline structure of a shifting control device for vehicle (hereinafter referred to as a "shifting control device") 10 to which the present invention is applied. The shifting control device 10 includes an electronic control section 20, a shift operation device 30, a transmission 40 and a parking lock device 50, etc., and functions as a shifting control device of a shift-by-wire system to switch shifting positions (shift positions or shift ranges) of the transmission 40 by electric control. Hereunder, description will be provided of an exemplary case with the shifting control device 10 of the present invention applied to the transmission 40 preferably used for a hybrid vehicle including a drive-force source comprised of an engine and an electric motor. However, the vehicle, to which the shifting control device 10 of the present invention is applied, may be vehicles of various types such as a usual engine-propelled vehicle, a hybrid vehicle and an electric vehicle, etc.

The electronic control section 20 has a structure including a so-called microcomputer comprised of a CPU, a ROM, a RAM and input and output interfaces, etc. Signal processing executed in accordance with programs preliminarily stored in the ROM with utilizing a temporarily storing function of the RAM executes a drive control such as a hybrid drive control or the like related to the engine (not shown) and the electric motor incorporated in the transmission 40, and a switching control for switching shift ranges in the transmission 40 by using the shift-by-wire system.

The electronic control section 20 is applied with various signals including: positional signals delivered from a shift sensor 36 and a select sensor (see FIG. 2) 38, acting as position sensors for detecting an operated position (shift position) $P_{SH}$ of for instance a shift lever 32, depending on the shift position $P_{SH}$ of the shift lever 32; a P-switching signal representing a switching operation of a P-switch 34 operable by a user for switching the shift range of the transmission 40 between a parking range (P-range) and non-P-ranges except the P-range; and a P-position signal representing an operating state of a parking lock in the parking lock device 50, actuated when the parking lock is operated or released, for switching the shift range of the transmission 40 between the P-range and the non-P-ranges.

The electronic control section 20 is further applied with other signals including: a power switching signal representing a switching operation of a vehicle power source switch 80 operable by the user for switching a vehicle power source in a turn-on state (vehicle power source TURN-ON) and a turn-off state (vehicle power source TURN-OFF); an output rotation speed signal delivered from an output rotation sensor 82 to represent a rotation speed $N_{OUT}$ of an output rotation member of the transmission 40; a motor rotation speed sensor delivered from a motor rotation sensor (such as a resolver) 84 to represent a rotation speed $N_M$ of the electric motor incorporated in the transmission 40; a wheel-velocity pulse signal, forming one of vehicle-speed correlation values representing rotation speeds $N_W$ of respective drive wheels, which is delivered from a wheel velocity sensor 86 serving as a rotation speed sensor; a brake operation signal delivered from a brake switch 88 to represent a foot-brake operation $B_{ON}$; and an acceleration signal delivered from a vehicle acceleration sensor 94 to represent a vehicle acceleration G (including a vehicle deceleration G), etc.

Further, the electronic control section 20 outputs various output signals including: an engine-output control command signal for controlling for instance an engine output; a hybrid-motor control command signal for commanding the electric motor in the transmission 40 to operate; a shift-range switching control command signal for switching the shift ranges in the transmission 40; a shift-range display control command signal operative to activate an indicator (shift range display device) 90 to display a switched state of the shift ranges in the transmission 40, and a parking-lock display control command signal for displaying a parking lock state; a vehicle speed display-control command signal for activating a meter (speed meter) 92 to display a current vehicle speed; and a P-switching control command signal for commanding the parking lock device 50 to operate, etc.

More particularly, the electronic control section 20 includes a power-source control computer (hereinafter referred to as a "PM-ECU") 22, a hybrid control computer (hereinafter referred to as a "HV-ECU") 24, a parking control computer (hereinafter referred to as "P-ECU") 26, an electronic control brake computer (hereinafter referred to as a "skid control ECU") 27 and a meter control computer (hereinafter referred to as a "Meter-ECU") 28, etc.

The PM-ECU 22 switches the vehicle power source between the vehicle power source TURN-ON and the vehicle power source TURN-OFF for instance in response to a power switching signal delivered from the vehicle power source switch 80 operated by the user. Upon detecting the power switching signal being input with the vehicle power source TURN-OFF for instance the PM-ECU 22 turns on a relay (not shown), operative to switch the vehicle power source TURN-ON and the vehicle power source TURN-OFF, upon which the vehicle power source TURN-ON is established. Further, upon detecting a vehicle speed V falling not more than a given vehicle speed V' (or less than or below the predetermined vehicle speed V') and the power switching signal being input with the vehicle power source TURN-ON, the PM-ECU 22 turns off the relay upon which the vehicle power source TURN-OFF is established. In addition, when a P-lock state signal delivered from the P-ECU 26 with the vehicle power source TURN-OFF represents the parking lock device 50 with the parking lock remained in a released state, the PM-ECU 22 outputs a signal to the P-ECU 26 for compelling the parking lock to be activated in the parking lock device 50 to switch the shift range to a P-range (such sequence operations being referred to as "auto-P operation"). As used herein, the term predetermined vehicle speed V' refers to a vehicle-halt determining vehicle speed preliminarily obtained on experimental tests and stored for instance to determine as to whether a vehicle halt state is established.

The HV-ECU 24 for instance performs an overall control of an operation of the transmission 40. For instance, the HV-ECU 24 detects a brake operation signal representing the foot-brake operation $B_{ON}$ being input when the PM-ECU 22 switches the vehicle power source TURN-OFF to the vehicle power source TURN-ON. Then, the HV-ECU 24 start-up a hybrid system for the vehicle running, and outputs a hybrid motor control command related to the vehicle running to the transmission 40 for controlling the vehicle running. Moreover, the HV-ECU 24 outputs a shift range switching control command in response to the positional signals, depending on the shift position $P_{SH}$ delivered from the shift sensor 36 and the select sensor 38 to the transmission 40 for thereby switching the shift ranges. In addition, the HV-ECU 24 outputs the P-switching signal to the P-ECU 26 for switching the shift range between the P-range and the non-P-range in the transmission 40 in response to the P-switching signal delivered from the P-switch 34. Besides, the HV-ECU 24 outputs the display signal to the Meter-ECU 28 for displaying a state of the shift range. In the present embodiment, of course, the vehicle power source TURN-ON refers not only to a state under which the hybrid system is started up to enable the vehicle to run but also to another state under which even if the vehicle running is disenabled (a hybrid motor control can not be executed for the electric motor or the like), at least the shift range of the transmission 40 can be controllably switched.

For switching the shift range between the P-range and the non-P-range in response to the P-switching signal delivered from for instance the HV-ECU 24, the P-ECU 26 controllably drives the parking lock device 50 for operating or releasing the parking lock. Further, the P-ECU 26 determines in response to the P-position signal delivered from the parking lock device 50 and representing an activated state of the parking lock, as to whether the shift range of the transmission 40 remains in the P-position or the non-P-position. The determined result is output as a P-lock state signal to the PM-ECU 22 and the HV-ECU 24 or the like.

The skid control ECU 27 communicates with for instance the various sensors and the HV-ECU 24 to execute a regenerative coordinate control and brake controls such as an ABS (Antilock Brake System) operation control and a brake assist control. Further, the skid control ECU 27 converts the wheel-velocity pulse signal equivalent to for instance several tens pulses per one revolution of a wheel tire and delivered from the wheel velocity sensor 86, into a first vehicle speed signal V1. This first vehicle speed signal is transmitted to another ECU or the like via a CAN (Control Area Network) communication line for performing for instance on-vehicle multiplex communications. In addition, the skid control ECU 27 converts the wheel-velocity pulse signal output from the wheel velocity sensor 86 into a vehicle-speed square wave pulse signal (vehicle speed pulse signal), equivalent to several pulses per one revolution of an output rotation member of the transmission 40, which in turn is output to the Meter-ECU 28 via a direct connection line. As used herein, the term "direct connection line" refers to communication lines such as metallic wires composed of wire harnesses, which are directly connected to for instance each of the ECUs and the sensors, respectively, in one-to-one relation for executing a variety of controls.

The Meter-ECU 28 outputs a vehicle speed display-control command signal to the meter 92 for displaying the current vehicle speed. The meter 92 displays a state of the shift range in response to the vehicle speed display-control command signal output from the Meter-ECU 28. By counting (counting the number of) square waves of the vehicle speed pulse signal output from the skid control ECU 27, the Meter-ECU 28 determines a meter-display vehicle speed signal V. Then, the Meter-ECU 28 actuates the meter 92 in response to the resulting meter-display vehicle speed signal V to light on relevant segments for displaying the current vehicle speed. Further, the Meter-ECU 28 outputs a shift-display control command signal to the indicator 90 for displaying the state of the shift range in response to a display signal output from the HV-ECU 24. The indicator 90 displaying the state of the shift range in response to the shift-display control command signal output from the Meter-ECU 28. In addition, the Meter-ECU 28 outputs the meter-display vehicle speed signal V to the PM-ECU 22 via the direct connection line as a second vehicle speed signal V2.

The first vehicle speed signal V1 represents a multiplex-communication vehicle speed signal serving as vehicle speed information transmitted and received through the multiplex communication line such as for instance the CAN communication line described above, and is subjected to a direct code-signal conversion in cycles of for instance the wheel-velocity pulse signal. The vehicle speed signal V1 has the quicker response relative to an actual vehicle speed V, i.e., the quicker following characteristic relative to a variation in the actual vehicle speed V. In contrast, the second vehicle speed signal V2 represents a pulse-counted vehicle speed signal, acting as a vehicle speed information, which is determined by counting square waves of for instance the vehicle speed pulse signal in a predetermined time section. The second vehicle speed signal V2 is a signal based on the vehicle speed pulse signal having a relatively long cycle and resulting from several pulses per one revolution of the output rotation member of the transmission 40 which is converted from the wheel-velocity pulse signal equivalent to several tens pulses per one revolution of the wheel tire. As a result, the second vehicle speed signal V2 has slower response relative to the actual vehicle speed V than that of the first vehicle speed signal V1.

Thus, the shifting control device 10 of the present embodiment has the two vehicle speed signals (vehicle speed information) with a difference in the response relative to the actual vehicle speed V. In nature, although various controls may be conceivably executed with increased precision using the first vehicle speed signal V1 having the quicker response, there is a case, depending on utilization of the vehicle speed signal, the vehicle speed signal having the slower response relative to the actual vehicle speed V is sufficiently used. That is, there is a case where the vehicle speed signal, having the slower response relative to the actual vehicle speed V, has suitable application. For instance, one example of the vehicle speed signal used to provide the vehicle speed display is in the meter 92 or the like, as described above. When displaying the vehicle speed on such a meter 92 or the like, drivability may be degraded due to frequent changes of a numeric value or the like. Thus, the vehicle speed signal is considered to be preferable if the response is slower to some extent. Therefore, the second vehicle speed signal V2 can be the vehicle speed information used when taking a venture to have slower response. In addition, it can be said that the shifting control device 10 of the present embodiment includes communicating means of two different systems in communication of the vehicle speed signals having a different in response.

Figure 2:
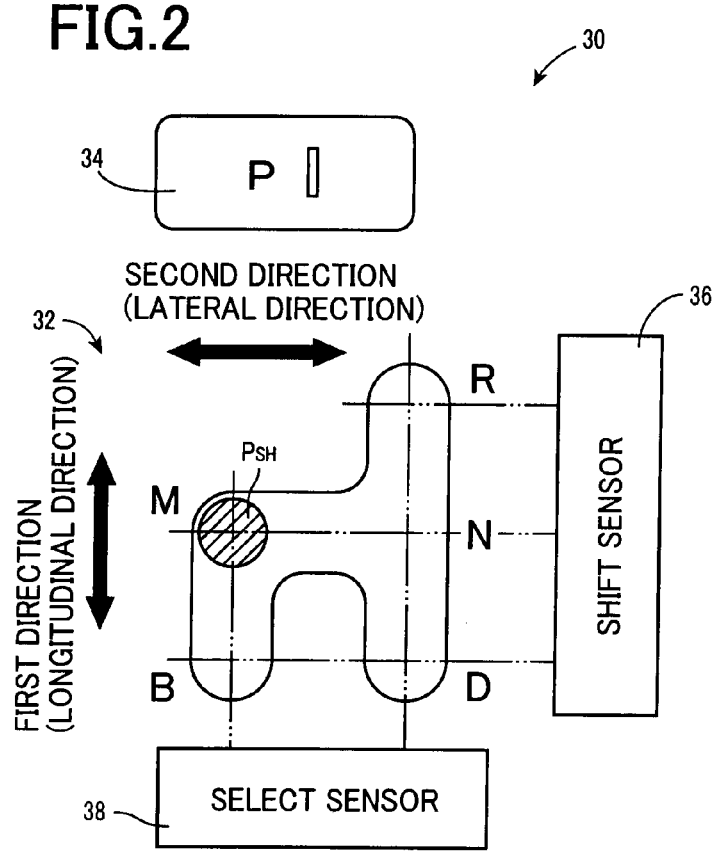
FIG. 2 is a graph showing one example of a shift operation device in the form of a switching device arranged to switch a plural kinds of shift ranges in a transmission by a manual operation.

FIG. 2 is a view illustrating one example of the shift operation device 30 acting as a switching device for switching plural kinds of shift ranges in the transmission 40 by a manual operation. The shift operation device 30, mounted in an area close proximity to for instance a driver's seat, includes a shifting lever 32 structured in the form of a momentary type operatively movable to a plurality of shift positions $P_{SH}$, i.e., an automatic return type as the operating lever automatically returned to an original position (initial position) with release of the operating force. Further, the shift operation device 30 of the present embodiment includes a P-switch 34, mounted as an independent switch in an area close proximity to the shift lever 32, to serve as a momentary type operating element for switching the shift range of the transmission 40 to the parking range (P-range) for the parking lock.

The shift lever 32 has an arrangement to be operable to three shift positions $P_{SH}$, arranged in a fore and aft direction or a vertical direction, i.e., a longitudinal direction of the vehicle as shown in FIG. 2, which includes a position "R" (R-position), a position "N" (N-position) and a position "D" (D-position), and a position "M" (M-position) and a position "B" (B-position) arrayed in parallel to a layout of the former three positions. Thus, the positional signal is output to the HV-ECU 24 depending on the shift positions $P_{SH}$. Further, the shift lever 32 can be operated in the longitudinal direction to one of the R-position, the N-position and the D-position, can be operated in the longitudinal direction between the M-position and the B-position, and can be operated in a lateral direction of the vehicle intersecting the longitudinal direction thereof to have one of the N-position and the B-position.

The P-switch 34 is for instance a momentary type push-button switch, which outputs the P-switching signal to the HV-ECU 24 in each depression by the user. If the P-switch 34 is depressed with the shift range of the transmission 40 switched in for instance the non-P-range, the P-ECU 26 causes the shift range to switch to the P-range in response to a P-switching signal delivered from the HV-ECU 24, provided that a predetermined condition such as the vehicle remained under a halted condition is satisfied. The P-range represents a parking range in which the parking lock is performed by a power transmitting path being interrupted in the transmission 40 and the parking lock device 50 mechanically blocks the drive wheels from rotating.

The M-position of the shift operation device 30 represents an initial position (home position) of the shift lever 32. Even if the shift lever 32 is shifted to the shift positions $P_{SH}$ (the positions "R", "N", "D" and "B") other than the M-position, it is returned to the M-position by the action of a mechanical mechanism such as a spring or the like, when the user releases the shift lever 32, i.e., when an external force, acting on the shift lever 32, is removed. With the shift operation device 30 operatively shifted to each shift position $P_{SH}$, the HV-ECU 24 allows the shift range to be switched to a shift range associated with the shift position $P_{SH}$ subsequent to the shift operation in response to the shift position $P_{SH}$ (positional signal). In addition, the indicator 90 displays the current shift position $P_{SH}$, i.e., a state of the shift range in the transmission 40.

Description will be provided of the various shift ranges. The R-range, selected when the shift lever 32 is operated to the position "R", represents a reverse-drive running range in which a drive force is transmitted to the drive wheels to drive the vehicle in a reverse direction. Further, the neutral range (N-range), selected when the shift lever 32 is operated to the position "N", represents a neutral range to establish a neutral state under which the power transmitted path is interrupted in the transmission 40. Furthermore, the D-range, selected when the shift lever 32 is operated to the position "D", represents a forward-drive running range in which a drive force is transmitted to the drive wheels 38 to drive the vehicle in a forward direction. If the shift range is switched to for instance the P-range, the HV-ECU 24 determines that the shift operation is executed to a predetermined shift position $P_{SH}$ (particularly, the position "R", the position "N" or the position "D") for releasing a halted movement (in a parking lock) of the vehicle. Then, the HV-ECU 24 outputs a P-switching signal to the P-ECU 26 for releasing the parking lock. A P-switching control command signal is output from the P-ECU 26 to the parking lock device 50 in response to the P-switching signal delivered from the HV-ECU 24 for releasing the parking lock. Then, the HV-ECU 24 allows the shift range to be switched to a shift range associated with a shift position $P_{SH}$ subsequent to such a shift operation.

Further, the B-range, selected when the shift lever 32 is operated to the position "B", represents a reduced-speed forward-drive running range (engine braking range), for instance by causing the electric motor to generate regenerative torque in the D-range, to provide an engine braking effect for reducing rotation of the drive wheels. Accordingly, even if the shift lever 32 is operatively shifted to the position "B" from the current shift range other than the D-range, the HV-ECU 24 causes such a shift operation to be ineffective. The shift operation to the position "B" is caused effective only when in the current shift range is the D-range. For instance, even if the driver performs the shift operation to the position "B" from the P-range, the shift range is remained in the P-range.

In the shift operation device 30 of the present embodiment, the shift lever 32 is returned to the position "M" in the removal of an external force acting thereon. Thus, a mere visual contact with the shift position $P_{SH}$ of the shift lever 32 can not recognize the shift range being selected. Therefore, the indicator 90 is located in a position to be easily visible for the driver to display such information inclusive of the sift range being selected in the P-range.

The shift operation device 30 of the present embodiment adopts the so-called shift-by-wire to be operated in two-dimensional directions including the first direction aligned in the longitudinal direction, and the second direction in line with the lateral direction intersecting with (orthogonal to in FIG. 2) the first direction. Accordingly, for the shift position $P_{SH}$ to be output to the electronic control section 20 as a detection signal of the position sensor, there are provided the shift sensor 36 acting as a first detecting section for detecting the shift operation in the first direction, and the select sensor 38 acting as a second detecting section for detecting the shift operation in the second direction. Voltages as the detection signals (positional signals) are output from both of the shift sensor 36 and the select sensor 38 to the electronic control section 20 depending on the shift position $P_{SH}$. Then, the electronic control section 20 recognizes (determines) the shift position $P_{SH}$ based on such detection signal voltages. That is, it can be said that the first detecting section (shift sensor 36) and the second detecting section (select sensor 38) form a shift position detecting section as a whole to detect the shift position $P_{SH}$ of the shift operation device 30.

Figure 3:
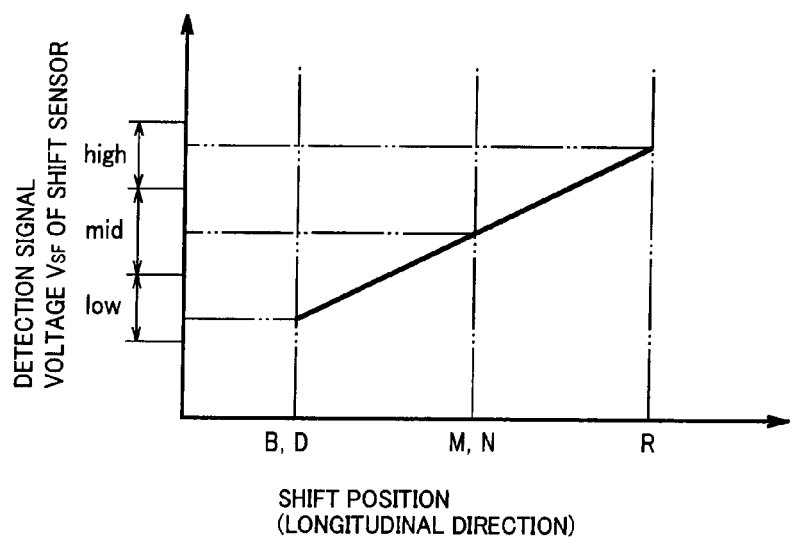
FIG. 3 is a view showing the relationship between a longitudinally extending shift position of a shift operation device and a detection signal voltage of a shift sensor incorporated in the shift operation device.
Figures 4, 5:
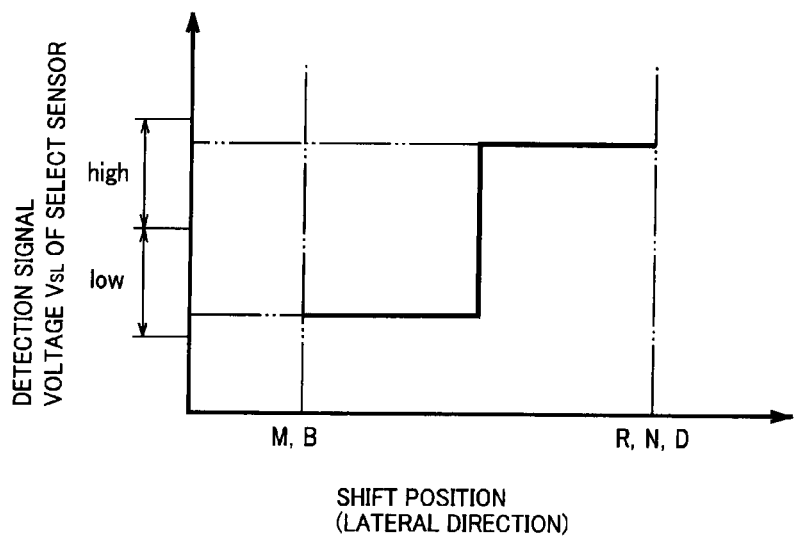
FIG. 4 is a view showing the relationship between a laterally extending shift position of the shift operation device shown in FIG. 2, and a detection signal voltage of a select sensor incorporated in the shift operation device.
FIG. 5 is a view illustrating a correlation between combination of the detection signal voltages of the shift sensor and the select sensor, and the shift positions.

To describe one example of recognition of the shift position $P_{SH}$, the shift sensor 36 provides a detection signal voltage $V_{SF}$ as shown in FIG. 3. The detection signal voltage $V_{SF}$ takes various voltages including: a voltage falling in a low range in the presence of the shift position $P_{SH}$ in the longitudinal direction (first direction) switched to the position "B" or "D"; a voltage falling in a med range higher than that of the low range in the presence of the position "M" or "N"; and a voltage falling in a high range higher than that of the med range in the presence of the position "R". Further, as shown in FIG. 4, the detection signal voltage $V_{SL}$ of the lever sensor 38 takes various voltages, which includes: a voltage falling in a low range in the presence of the shift position $P_{SH}$ relevant to the lateral direction (second direction) switched to the position "M" or "B"; and a voltage falling in a high range higher than that of the low range in the presence of the position "R", "N" or "D". Upon detecting the detection signal voltages $V_{SF}$ and $V_{SL}$ as shown in a diagram shown in FIG. 5, the HV-ECU 24 recognizes that: if "$V_{SF}$=mid and $V_{SL}$=high", the shift position $P_{SH}$ is switched to the position "N"; if "$V_{SF}$=high and $V_{SL}$=high", the shift position $P_{SH}$ is switched to the position "R"; if "$V_{SF}$=low and $V_{SL}$=high", the shift position $P_{SH}$ is switched to the position "D"; if "$V_{SF}$=mid and $V_{SL}$=low", the shift position $P_{SH}$ is switched to the position "M"; and if "$V_{SF}$=low and $V_{SL}$=low", the shift position $P_{SH}$ is switched to the position "B". In FIG. 3, further, although the various ranges such as the range "low", the range "mid" and the range "high" are continuous, these ranges may have a dead band that disenables a determination. Properties of the detection signal voltage $V_{SF}$ of the shift sensor 36, i.e., characteristics ranging from "low" to "high" relative to the shift position $P_{SH}$ in the longitudinal direction may vary from "high" to "low" oppositely. In the same manner, in FIG. 4, although the various ranges such as the range "low" and the range "high" are continuous, these ranges may have a dead band that disenables a determination. Properties of the detection signal voltage $V_{SL}$ of the select sensor 38, i.e., characteristics ranging from "low" to "high" relative to the shift position $P_{SH}$ in the lateral direction may vary from "high" to "low" oppositely.

Thus, the shift position $P_{SH}$ is recognized by the fly-ECU 24. However, to prevent the occurrence of erroneous operation and erroneous recognition (determination) or the like, the shift range is not immediately switched to the shift range associated with the shift position $P_{SH}$ subsequent to the shift operation even when the shift operation establishes such a shift position $P_{SH}$. Predetermined range fixing times (shift operation fixing times) are preliminarily set for respective shift positions $P_{SH}$ or respective shift ranges. For instance, if the shift lever 32 remains at the shift position $P_{SH}$ subsequent to the shift operation for a time period, i.e., a residence time exceeding the predetermined range fixing time, the HV-ECU 24 allows such a shift operation to be fixed for switching to the shift range associated with the shift position $P_{SH}$ subsequent to the shift operation. Description will be provided of an exemplary case where the shift range is switched from the P-range to the N-range. When the position "M" is switched to the position "N" with the shift range remained in the position "P", the staying time of the shift lever 32 in the position "N" exceeds a neutral range fixing time representing the predetermined range fixing time for fixing the shift operation to the position "N". Then, the HV-ECU 24 fixes (determines) that the shift position $P_{SH}$ subsequent to the shift operation is the position "N", thereby switching the P-range to the N-range in the transmission 40.

Figure 6:
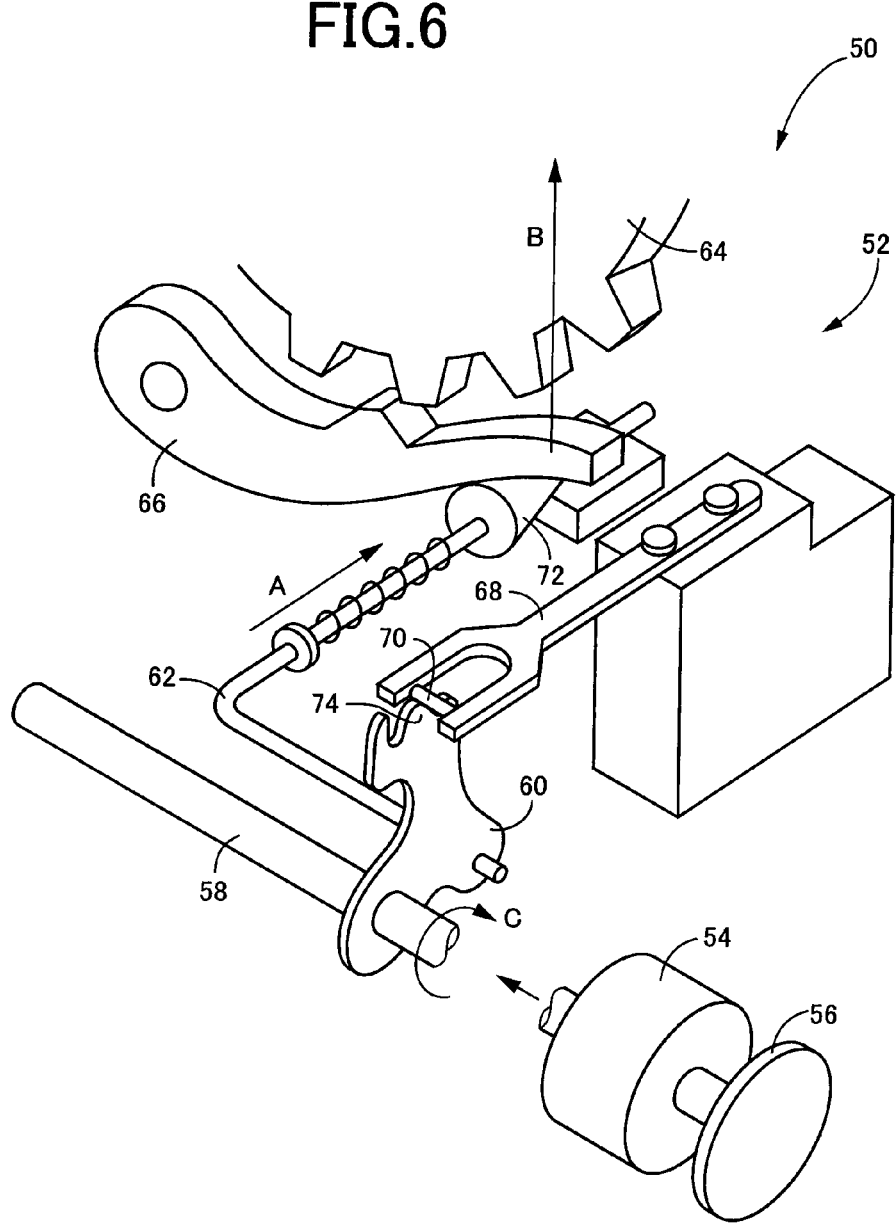
FIG. 6 is a view illustrating a structure of a parking lock device arranged to mechanically block the rotations of drive wheels.

FIG. 6 is a view illustrating a structure of the parking lock device 50 arranged to mechanically block the drive wheels from rotating. In FIG. 6, the parking lock device 50 is an actuator including a P-lock mechanism 52, a P-lock drive motor 54 and an encoder 56, etc., and operates to block the movement of the vehicle in response to a control signal delivered from the electronic control section 20.

The P-lock drive motor 54 is constituted of a switched reluctance motor (SR motor) to drive the P-lock mechanism 52 with a shift-by-wire system upon receipt of a command (control signal) from the P-ECU 26. The encoder 56 is a rotary encoder, arranged to output signals in phases "A", "B" and "Z", which unitarily rotates with the P-lock drive motor 54 for detecting a rotary state of the SR motor. Thus, the encoder 56 supplies the P-ECU 26 with a signal representing such a rotary state, i.e., a pulse signal for acquiring a count value (encoder count) depending on displacement amount (rotated amount) of the P-lock drive motor 54. Upon receipt of such a signal supplied from the encoder 56, the P-ECU 26 grasps the rotary state of the SR motor for performing a power distribution control thereto.

The P-lock mechanism 52 includes: a shaft 58 drivably rotated with the P-lock drive motor 54; a detent plate 60 rotatable with the shaft 58 in rotation thereof; a rod 62 operable with the detent plate 60 in rotation thereof; a parking gear 64 rotatable in conjunction with the drive wheels; a parking lock pole 66 operative to block (lock) the rotation of the parking gear 64; a detent spring 68 operative to limit the rotation of the detent plate 60 for the shift position to be fixedly secured; and a skid 70. A disposing position of the parking gear 64 is not limited as long as locking of the parking gear 64 locks the drive wheels. The parking gear 64 is fixed on for instance the output rotation member of the transmission 40.

The detent plate 62 is operatively connected to a drive shaft of the P-lock drive motor 54 via the shaft 58, and is driven by the P-lock drive motor 54 together with the rod 62, the detent spring 68 and the skid 70, etc. The detent plate 60 functions as a parking lock positioning member to switch a parking lock position associated with the P-range, and a non-parking lock position associated with the respective shift ranges other than the P-range. The shaft 58, the detent plate 60, the rod 62, the detent spring 68 and the skid 70 operate a parking lock switching mechanism.

FIG. 6 shows a state under which the non-parking lock position is established. Under such a state, since no parking lock pole 66 locks the parking gear 64, no P-lock mechanism 52 blocks the drive wheels from rotating. Under such a state, rotating the shaft 58 in a direction as indicated by an arrow C in FIG. 6 by the P-lock drive motor 54 pushes the rod 62 in a direction as indicated by an arrow A in FIG. 6 via the detent plate 60. This causes a taper member 72 mounted on the rod 62 at a distal end thereof to push up the parking lock pole 66 in a direction as indicated by an arrow B in FIG. 6. As the detent plate 60 is rotated, the skid 70 of the detent spring 68 placed in one of two valleys, i.e., a non-parking lock position formed on the detent plate 60 at a top thereof, is caused to ride over a ridge 74 into the other one of the valleys, i.e., a parking lock position. The skid 70 is provided on the detent spring 68 to be rotatable about its center axis. When the detent plate 60 is rotated until the skid 70 reaches the parking lock position, the parking lock pole 66 is pushed up to a position engageable with the parking gear 64. This mechanically blocks the drive wheels from rotating in conjunction with the parking gear 64, so that the shift range is switched to the P-range.

Here, the shift range of the transmission 40 is switched from the non-P-range to the P-range for the parking lock under the various modes mentioned above. One of such modes is the usual switching to the P-range (usual P-operation) that is executed with the predetermined condition being satisfied when the shift range of the transmission 40 is placed in the non-P-range by for instance depression of the P-switch 34 by the driver and the vehicle remained in a halted state, etc. Further, another mode is the switching to the P-range (the auto-P operation) that is executed together with establishing the power source TURN-ON when the predetermined condition is satisfied with the shift range of the transmission 40 switched to the non-P-range by depression of the P-switch 34 by the driver and the vehicle speed V dropping not more than the predetermined vehicle speed V', etc. Thus, the driver performs such predetermined operations for switching the shifting range to the parking range such as the depressive operation of the P-switch 34 to switch the shift range to the parking range in the transmission 40, and the depressive operation of the vehicle power source switch 80 to switch the vehicle power source TURN-ON to the vehicle power source TURN-OFF, etc. In this case, the switching to the parking range is determined on the condition that at least the vehicle is remained in a halt state (for instance, the vehicle speed V falling not more than the predetermined vehicle speed V').

Meanwhile, in accordance with the present embodiment set forth above, the vehicle speed V includes the first vehicle speed signal V1 having quicker response relative to the actual vehicle speed V, and the second vehicle speed V2 having slower response relative to the actual vehicle speed V. Accordingly, when using one of the first and second vehicle speed signals V1 and V2 to determine as to whether the vehicle halt state, the vehicle halt state is determined using the predetermined vehicle speed V' in conformity to response of the vehicle speed signal in use, i.e., the actual vehicle speed V. Subsequently, whether to switch the shift range to the parking range is determined.

On the contrary, in order to determine switching to the parking range even in the absence of one of the vehicle speed signals owing to a failure or the like in for instance one of the communication lines of the systems, it may be considered to determine the vehicle halt state using both of the vehicle speed signals V1 and V2. When the driver performs the predetermined operation for switching the shifting range to the parking range, for instance, the electronic control section 20 (for instance, the PM-ECU 22) may conceivably determine the switching to the parking range based on whether the plural vehicle speed signals different in response relative to the actual vehicle speed V satisfy the predetermined condition. For instance, such determination is made on the condition that both the vehicle speed signal V1 and the vehicle speed signal V2 become not more than the predetermined vehicle speed V'.

In such a case, in the end of deceleration, based on the second vehicle speed signal V2 with slower response, the vehicle halt is determined, upon which the parking lock is executed. Then, due to the second vehicle speed signal V2 having slower response in drop of the vehicle speed in the predetermined operation just after the vehicle halt after the speed reduction, regardless of the actual vehicle speed V dropping not more the predetermined vehicle speed V', the second vehicle speed signal V2 exceeding the given vehicle speed V' is determined. There is a possibility that the parking lock depending on such a predetermined operation can not be executed. In other words, the vehicle halt state is finally determined based on the second vehicle speed signal V2 with slower response during deceleration, so that the determination with increased precision for the vehicle halt state using the first vehicle speed signal V1 with quicker response, may not be utilized.

In accordance with the present embodiment, therefore, the electronic control section 20 (such as, for instance, PM-ECU 22) determines the switching to the parking range using a corrected value obtained by correcting the predetermined vehicle speed V' serving as a predetermined vehicle-speed threshold value associated with the first vehicle speed signal V1, such that the slower the response of the second vehicle signal V2 having a slower response is, the larger will be the corrected value than the corrected value associated with the first vehicle speed signal V1 having the quicker response. The predetermined vehicle speed V' representing the vehicle-speed threshold value for determining the switching of the shift range to the parking range, can be a parking-lock allowable vehicle speed.

Figure 7:
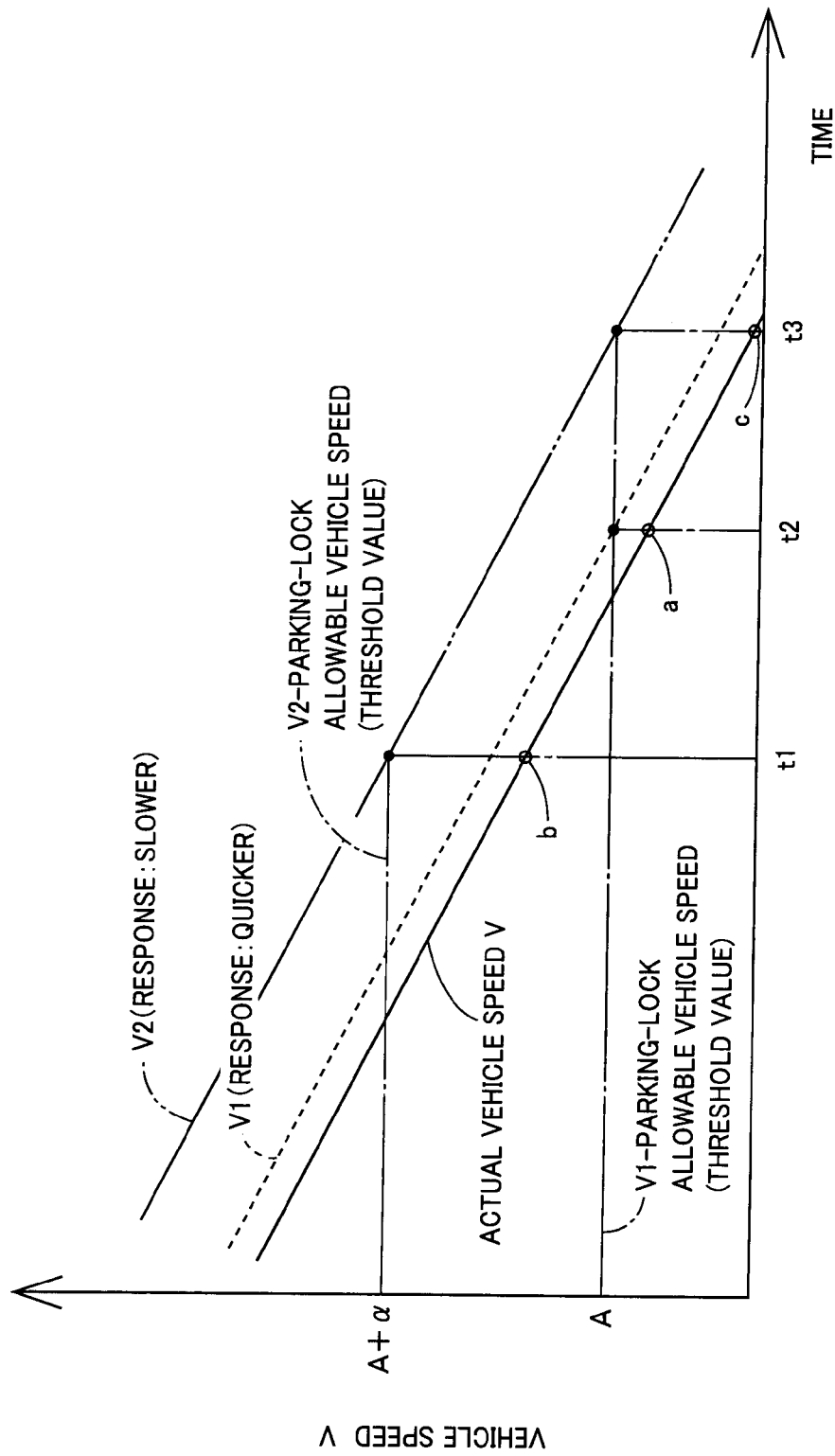
FIG. 7 is a view illustrating a parking-lock allowable vehicle speed associated with a first vehicle speed, and another parking-lock allowable vehicle speed associated with a second vehicle speed as a corrected value obtained by correcting parking-lock allowable vehicle speed.

FIG. 7 is a view for illustrating a V1-parking-lock allowable vehicle speed A, associated with the first vehicle speed signal V1, and a V2-parking-lock allowable vehicle speed (A+α) associated with the second vehicle speed signal V2 serving as the corrected value resulting from correcting the V1-parking-lock allowable vehicle speed A. In FIG. 7, the V2-parking-lock allowable vehicle speed (A+α) is set based on a delay in response of the second vehicle speed signal V2 relative to the actual vehicle sped V, such that the slower the response of the second vehicle speed signal V2 having the slower response is, the earlier i.e., the more easily the predetermined condition is satisfied than the first vehicle speed signal V1 having the quicker response. The predetermined condition is that the second vehicle speed signal V2 becomes not more than the V2-parking-lock allowable vehicle speed (A+α). This is because the switching to the parking range is finally determined based on the first vehicle speed signal V1 having the quicker response, i.e., a vehicle speed closer to the actual vehicle speed V with increased precision.

Reference "α" of the V2-parking-lock allowable vehicle speed (A+α) corresponds to a corrected amount "α" by the correction and is preliminary obtained on experimental tests for storage based on the delay in response of the second vehicle speed signal V2 relative to the actual vehicle sped V. Further, the corrected amount "α" is set larger for the larger deceleration G in comparison to achieve the smaller deceleration G. Thus, the delay in response of the second vehicle speed signal V2 having the slower response to the actual vehicle speed, which largely varies for the larger deceleration G, can be appropriately corrected. Consequently, the switching to the parking range is surely determined at a vehicle speed closer to the actual speed, regardless of magnitude of the vehicle deceleration G.

Thus, when the V1-parking-lock allowable vehicle speed A and the V2-parking-lock allowable vehicle speed (A+α) are determined in such a way, during a period (−t1) before a timing t1, none of the predetermined conditions is satisfied including a predetermined condition under which the first vehicle speed signal V1 becomes not more than the V1-parking-lock allowable vehicle speed A and another predetermined condition under which the second vehicle speed signal V2 becomes not more than the V2-parking-lock allowable vehicle speed (A+α). Even if the driver performs the predetermined condition for switching the shifting range to the parking range during such a period (−t1), the relevant operation is nullified or mode ineffective with no execution of operation for switching to the parking range.

During a period (t1−t2) before a timing t2 subsequent to the timing t1, although another predetermined condition is satisfied earlier or easily that the second vehicle speed signal V2 becomes not more than the V2-parking-lock allowable vehicle speed (A+α), no predetermined condition is satisfied that the first vehicle speed signal V1 becomes not more than the V1-parking-lock allowable vehicle speed A. Even if the driver performs the predetermined operation for switching the shifting range to the parking range during the period (t1−t2), the relevant operation is still nullified with no execution of operation for switching to the parking range.

During a period (t2−), further, both of the predetermined conditions are satisfied that the predetermined condition with the first vehicle speed signal V1 becomes not more than the V1-parking-lock allowable vehicle speed A and another predetermined condition that the second vehicle speed signal V2 becomes not more than the V2-parking-lock allowable vehicle speed (A+α). If the driver performs the predetermined operation for switching the shifting range to the parking range during such a period (t2−), the switching to the parking range is determined, upon which the parking lock is performed in response to such a predetermined operation. As shown by a white dot "a" in FIG. 7, accordingly, a determination is made for switching to the parking range when the actual vehicle speed V is not more than the V1-parking-lock allowable vehicle speed A, i.e., the predetermined vehicle speed V'.

Further, if either one of the first and second vehicle speed signals V1 and V2 falls in failures for instance is absent, the electronic control section 20 (for instance, PM-ECU 22) determines the switching to the parking range without using the vehicle speed signal falling in the failure but using the other vehicle speed signal remained in a normal state. For instance, if the second vehicle speed V2 falls in the failure, the determination for switching to the parking range may be made using the first vehicle speed signal V1 based on whether the predetermined condition is satisfied that the first vehicle speed signal V1 becomes not more than the V1-parking-lock allowable vehicle speed A. In this case, like a case in which both the first and second vehicle speed signals V1 and V2 are normal, the determination is made for switching to the parking range when the actual vehicle speed V is not more than the V1-parking-lock allowable vehicle speed A, i.e., the predetermined vehicle speed V' as shown by the white dot "a" in FIG. 7.

However, with the first vehicle speed signal V1 falling in the failure, the determination is made for switching to the parking range, using the second vehicle speed signal V2, based on whether another predetermined condition is satisfied that the second vehicle speed signal V2 becomes not more than the V2-parking-lock allowable vehicle speed (A+α). In this case, as shown by a white dot "b" in FIG. 7, when the actual vehicle speed V exceeds the V1-parking-lock allowable vehicle speed A, i.e., the predetermined vehicle speed V', that is when the actual vehicle speed V is not more than the given vehicle speed V', the switching to the parking range is determined.

In view of this, the electronic control section 20 (for instance, PM-ECU 22) does not performs such correction to make the V1-parking-lock allowable vehicle speed A to be the V2-parking-lock allowable vehicle speed (A+α) on using the second vehicle speed signal V2, in the presence of a failure in the first vehicle speed signal V1 having the quicker response. That is, when the first vehicle speed signal V1 having the quicker response falls in the failure, the electronic control section 20 (for instance, PM-ECU 22) determines the switching to the parking range using the second vehicle speed V2 based on whether the predetermined condition is satisfied that the second vehicle speed V2 becomes not more than the V1-parking-lock allowable vehicle speed A. In this case, even if in the period (t2−) after the timing t2 in FIG. 7, no determination is made for switching to the parking range until a period (t3−) after a timing t3 is reached. In this period, no parking lock is executed in response to the predetermined operation. As shown by a white dot "c" in FIG. 7, however, the determination is made for switching to the parking range when the actual vehicle speed V is surely becomes not more than the V1-parking-lock allowable vehicle speed A, i.e., the predetermined vehicle speed V'. Thus, the determination for switching to the parking range when no actual vehicle speed V drops not more the predetermined vehicle speed V', can be avoided.

Figure 8:
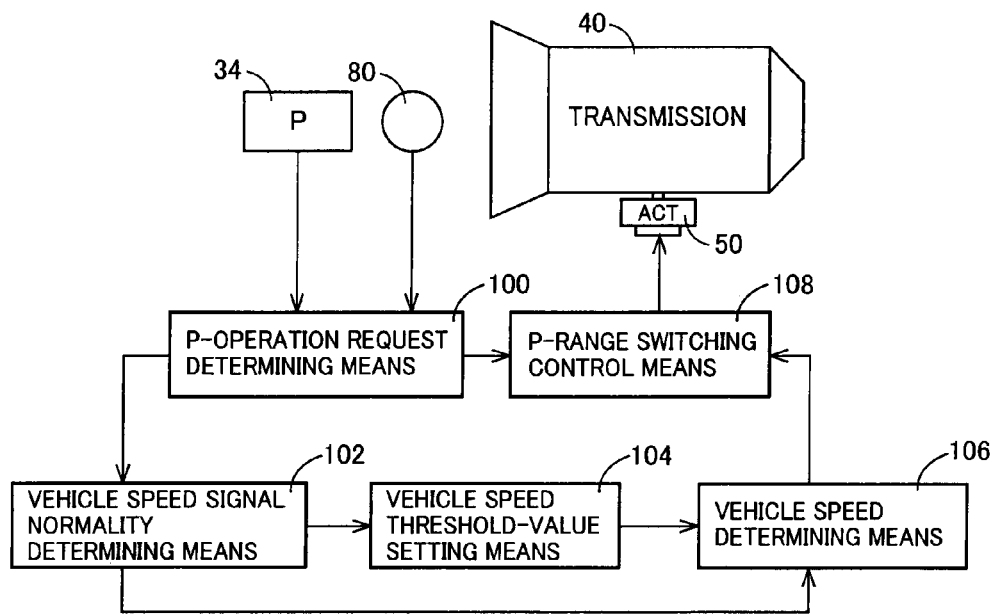
FIG. 8 is a functional block diagram illustrating a major part of a control function of an electronic control section shown in FIG. 1.

FIG. 8 is a functional block diagram illustrating a major part of a control function to be executed by the shifting control device 10 (electronic control section 20). In FIG. 8, P-operation request determining section, i.e., P-operation request determining means 100 determines as to whether the given operation is made by the driver to switch the shift range to the parking range. For instance, if the shift range has the non-P-range in the transmission 40, the P-operation request determining means 100 determines in response to the P-switching signal delivered from the P-switch 34 as to whether the driver depresses the P-switch 34. In addition, if the shift range assumes the non-P-range in the transmission 40 in the presence of the vehicle power source TURN-ON, the P-operation request determining means 100 determines in response to the power switching signal delivered from the vehicle power source switch 80 as to whether the driver manipulates to turn on the vehicle power source switch 80. That is, the P-operation request determining means 100 determines as to whether the driver executes the operation to execute the auto-P operation.

Vehicle speed signal normality determining section, i.e., vehicle speed signal normality determining means 102 determines based on whether for instance the first vehicle speed signal V1 is applied to the PM-ECU 22, as to whether the first vehicle speed signal V1 is normal. For instance, if the first vehicle speed signal V1 is absent or interrupted, then, the vehicle speed signal normality determining means 102 determines that the first vehicle speed signal V1 is in a failure. Moreover, the vehicle speed signal normality determining means 102 determines, based on whether for instance the second vehicle speed signal V2 is applied to the PM-ECU 22, as to whether the second vehicle speed signal V2 is normal. For instance, if the second vehicle speed signal V2 is absent or interrupted, the vehicle speed signal normality determining means 102 determines that the second vehicle speed signal V2 falls in a failure, i.e., is abnormal.

Vehicle speed threshold-value setting section, i.e., vehicle speed threshold-value setting means 104, sets the V1-parking-lock allowable vehicle speed A as the parking-lock allowable vehicle speed used for in determining the first vehicle speed signal V1. If the vehicle speed signal normality determining means 102 determines that the first vehicle speed signal V1 is normal, then, the vehicle speed threshold-value setting means 104 sets the V2-parking-lock allowable vehicle speed (A+α), obtained by correcting the V1-parking-lock allowable vehicle speed A used for in determining the first vehicle speed signal V1, as the parking-lock allowable vehicle speed used for in determining the second vehicle speed V2. In contrast, if the vehicle speed signal normality determining means 102 determines that the first vehicle speed signal V1 falls in the failure, then, the V1-parking-lock allowable vehicle speed A used for in determining the first vehicle speed signal V1 is used with no correction as the parking-lock allowable vehicle speed used for in determining the second vehicle speed V2.

Vehicle speed determining section, i.e., vehicle speed determining means 106, determines as to whether the predetermined conditions are satisfied for the vehicle speed signals. For instance, the vehicle speed determining means 106 determines as to whether the first vehicle speed signal V1 becomes not more than the V1-parking-lock allowable vehicle speed A. If the vehicle speed signal normality determining means 102 determines that the first vehicle speed signal V1 is normal, then, the vehicle speed determining means 106 determines as to whether the second vehicle speed signal V2 becomes not more than the V2-parking-lock allowable vehicle speed (A+α). On the contrary, if the vehicle speed signal normality determining means 102 determines that the first vehicle speed signal V1 is abnormal, then, the vehicle speed determining means 106 determines as to whether the second vehicle speed signal V2 becomes not more than the V1-parking-lock allowable vehicle speed A.

If the vehicle speed determining means 106 determines that the predetermined conditions are satisfied for the vehicle speed signals, then, P-range switching control section, i.e., P-range switching control means 108 allows the predetermined operation, performed by the driver for switching to the parking range determined by the P-operation request determining means 100, to be effective. Thus, the shift range of the transmission 40 is switched from the non-P-range to the P-range, and the drive of the parking lock device 50 is controlled to activate the parking lock in response to the predetermined operation. Further, if the predetermined operation, performed by the driver for switching to the parking range determined by the P-operation request determining means 100, is an operation for executing the auto-P operation, an operation to perform the auto-P operation is made effective. In addition to the switching to the P-range, the vehicle power source TURN-ON is switched to the vehicle power source TURN-OFF. On the contrary, if the vehicle speed determining means 106 determines that none of the predetermined conditions are satisfied for the vehicle speed signals, then, the P-range switching control means 108 nullifies the predetermined operation performed by the driver for switching to the parking range determined by the P-operation request determining means 100. In this case, no operation is executed to switch the shift range to the parking range. That is, no parking lock is executed in response to the predetermined operation.

Figure 9:
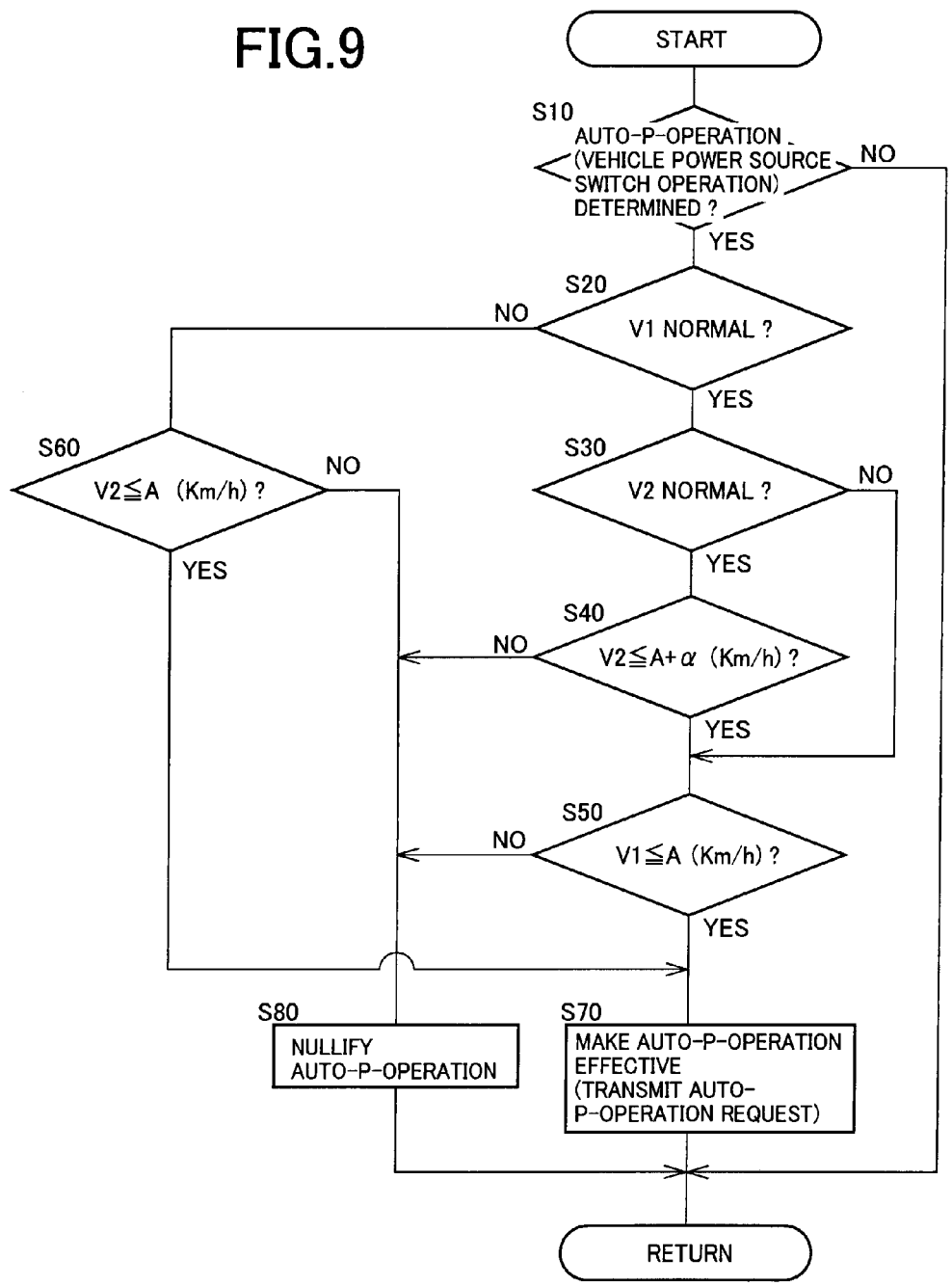
FIG. 9 is a flowchart illustrating a major part of control operations of the electronic control section, i.e., a series of control operations in which with utilizing determination for switching to a parking range with increased precision by a first vehicle speed signal having quicker response, occurrence of a difficulty in executing a parking lock in response to a parking lock demand by a second vehicle speed signal having a slower response is suppressed.

FIG. 9 is a flowchart illustrating a major part of control operations to be executed by the electronic control section 20. That is, FIG. 9 is a sequence of control operations for utilizing the determination with increased precision for switching the shifting range to the parking range by using the first vehicle speed signal V1 having the quicker response with suppressing a difficulty of executing the parking lock in response to a parking lock demand by using the second vehicle speed signal V2 with the slower response. This sequence is repeatedly executed for an extremely short cycle time in the order of, for instance, several milliseconds or several tens milliseconds.

First, at step (hereinafter the word "step" will be omitted) S10 corresponding to the P-operation request determining means 100, as to whether the driver has performed the predetermined operation for switching to the parking range is determined. For instance, when the shift range of the transmission 40 is switched to the non-P-range with the vehicle power source remained turned on, in response to the power switching signal delivered from the vehicle power source switch 80, as to whether the vehicle power source switch 80 is depressed by operation of the driver is determined. That is, as to whether the driver has performed the operation to execute the auto-P operation is determined. If the determination at S10 is negative, then, the current routine is terminated. If the determination at S10 is positive, then, at S20 also corresponding to the vehicle speed signal normality determining means 102, as to whether the first vehicle speed signal is normal is determined, for example based on whether the first vehicle speed signal V1 is applied to the PM-ECU 22.

If the determination at S20 is positive, then, at S30 also corresponding to the vehicle speed signal normality determining means 102, based on whether the second vehicle speed signal V2 is applied to for instance the PM-ECU 22, as to whether the second vehicle speed signal V2 is normal is determined. If the determination at S30 is positive, then, at S40 corresponding to the vehicle speed threshold-value setting means 104 and the vehicle speed determining means 106, the V2-parking-lock allowable vehicle speed (A+α) obtained by correcting the V1-parking-lock allowable vehicle speed A used for determining the first vehicle speed signal V1, is set as the parking-lock allowable vehicle speed used for in determining the second vehicle speed signal V2. In addition, as to whether the second vehicle speed signal V2 becomes less than the V2-parking-lock allowable vehicle speed (A+α) is determined.

If the determination at S30 is negative or if the determination at S40 is positive, then, at S50 corresponding to the vehicle speed threshold-value setting means 104 and the vehicle speed determining means 106, the V1-parking-lock allowable vehicle speed A is set as the parking-lock allowable vehicle speed used for determining the first vehicle speed signal V1. Further, as to whether the first vehicle speed signal V1 is not more than the V1-parking-lock allowable vehicle speed A is determined. If the determination at S20 is negative, then, at S60 corresponding to the vehicle speed threshold-value setting means 104 and the vehicle speed determining means 106, the V1-parking-lock allowable vehicle speed A used for determining the first vehicle speed signal V1 is not corrected and is set with no correction as the parking-lock allowable vehicle speed used for determining the second vehicle speed signal V2. In addition, as to whether the second vehicle speed signal V2 is not more than the V1-parking-lock allowable vehicle speed A is determined.

If the determination at S50 is positive or the determination at S60 is positive, then, at S70 corresponding to the P-range switching control means 108, the predetermined operation performed by the driver for switching to the parking range is made effective. Subsequently, the shift range is switched from the non-P-range to the P-range in the transmission 40, upon which the drive of the parking lock device 50 is controlled to operate the parking lock in response to the predetermined operation. For example, if the predetermined operation performed by the driver determined at S10 is for executing the operation for the auto-P operation, then, the operation for such an auto-P operation is made effective. In addition to the switching to the P-range, the vehicle power source TURN-ON is switched to the vehicle power source TURN-OFF.

On the contrary, if the determination at S40 is negative, if the determination at S50 is negative, or if the determination at S60 is negative, then, at S80 also corresponding to the P-range switching control means 108, the predetermined operation performed by the driver for switching the shifting range to the parking range and determined at S10 is nullified, so that no switching is executed to the parking range. That is, no parking lock is executed in response to the predetermined operation.

For instance, if the predetermined operation performed by the driver and determined at S10 is the operation for executing the auto-P operation, then, the operation for such an auto-P operation is nullified.

As set forth above, in accordance with the present embodiment, the switching to the parking range is determined using a corrected value (V2-parking-lock allowable vehicle speed (A+α)) obtained by correcting the predetermined vehicle speed V' (V1-parking-lock allowable vehicle speed A) as a predetermined vehicle-speed threshold value associated with the first vehicle speed signal V1 having the quicker response is corrected such that the slower the response of the second vehicle signal V2 having a slower response is, the larger will be the corrected value than the corrected value associated with the first vehicle speed signal V1 having the quicker response.

Therefore, as to whether the second vehicle speed signal V2 having the slower response satisfies a predetermined condition is determined considering the correction, while as to whether the first vehicle speed signal V1 having the quicker response satisfies the predetermined condition is determined by value as it is. Thus, easiness with the second vehicle speed signal V2 having the slower response for satisfying the predetermined condition is close to easiness with the first vehicle speed signal V1 having the quicker response for satisfying the predetermined condition, or exceeds it. Accordingly, in an electrical switching control for switching a transmission 40 to a parking range to perform a parking lock in response to an operation of a driver, a difficulty in executing the parking lock in response to the parking lock demand due to usage of a second vehicle speed signal V2 with slower response can be suppressed. In addition, a determination for switching to the parking range with increased precision using a first vehicle speed signal V1 with quicker response can be utilized.

In accordance with the present embodiment, further, the V2-parking-lock allowable vehicle speed (A+α) is set based on the delay in response of the second vehicle speed signal V2 relative to the actual vehicle speed V, such that the slower the response of the second vehicle speed signal V2 having the slower response is, the more easily or the earlier the predetermined condition is satisfied than the first vehicle speed signal V1 having the quicker response. Accordingly, the switching determination with increased precision to the parking range by the first vehicle speed signal V1 having quicker response is utilized. That is, the switching to the parking range is determined at a vehicle speed closer to the actual vehicle speed V.

In accordance with the present embodiment, furthermore, the corrected amount "α" is set larger such for the larger vehicle deceleration G, in comparison to for the smaller vehicle deceleration G A delay in response of the second vehicle speed signal V2 having the slower response relative to the actual vehicle speed V which largely varies for instance for the larger deceleration G, can be appropriately corrected. Consequently, the switching to the parking range is surely determined at a vehicle speed closer to the actual vehicle speed V, regardless of magnitude the vehicle deceleration G.

In accordance with the present embodiment, moreover, if the first vehicle speed signal V1 having the quicker response is abnormal, no correction is made for making the V1-parking-lock allowable vehicle speed A to the V2-parking-lock allowable vehicle speed (A+α) on using the second vehicle speed signal V2. In addition, the switching to the parking range is determined without using the abnormal first vehicle speed signal V1, with using the normal second vehicle speed signal V2. Therefore, though probability of a difficulty for executing the parking lock in response to the parking lock demand during the deceleration may increase, the determination for switching to the parking range, with no actual vehicle speed V satisfying the predetermined condition V', can be avoided.

In accordance with the present embodiment, further, one of the vehicle speed signals is the second vehicle speed signal V2 based on the vehicle speed pulse signal obtained by converting the wheel-velocity pulse signal detected by the wheel velocity sensor 86. Thus, the vehicle speed signal having the slower response relative to the actual vehicle speed V can be used to determine the switching to the parking range.

In accordance with the present embodiment, furthermore, the predetermined condition is a determining condition for determining whether a vehicle is halted based on the vehicle speed signals, and on performing the predetermined operation for switching to the parking range by the driver, if the predetermined condition is satisfied with the vehicle speed signals falling not more than the predetermined vehicle-speed threshold value (the V1-parking-lock allowable vehicle speed A and the V2-parking-lock allowable vehicle speed (A+α)), the switching to the parking range is determined. Such a determination allows the parking lock to be appropriately executed in response to the parking lock demand.

In accordance with the present embodiment, moreover, the shifting control device for vehicle further includes a auto-P operation function to execute the switching to the parking range and to turn off a vehicle power source, in response to the operation by the driver for switching the vehicle power source from a turn-on state to a turn-off state, and the predetermined operation performed by the driver for switching to the parking range is an operation for switching the vehicle power source from the turn-on state to the turn-off state. Such an operation performs the correction such that the V1-parking-lock allowable vehicle speed A is set as the V2-parking-lock allowable vehicle speed (A+α). This increases the number of chances for executing the switching to the parking range associating with the operation for switching the vehicle power source TURN-ON to the vehicle power source TURN-OFF.

In accordance with the present embodiment, further, the predetermined operation performed by the driver for switching to the parking range is an operation of the P-switch 34 to switch to the operated position for switching the shift range to the parking range in the transmission 40. With such an operation, owing to the correction as mentioned above, the number of chances for executing the switching to the parking range associating with operation of the P-switch 43 to switch the shift range to the parking range in the transmission 40 is increased.

Next, another embodiment according to the present invention will be described below. In the following description, further, the elements common to those of the above embodiment bear like reference numerals to omit description of the same.

Embodiment 2

In the illustrated embodiment set forth above, when both the first vehicle speed signal V1 having the quicker response and the second vehicle speed signal V2 having the slower response are normal, the switching of the shift range to the parking range is determined, based on whether the second vehicle speed signal V2 is not more than the V2-parking-lock allowable vehicle speed (A+α) and the first vehicle speed signal V1 is not more than the V1-parking-lock allowable vehicle speed A.

Meanwhile, in order to utilize the determination for switching to the parking range with increased precision, a determination may be conceivably executed using only the first vehicle speed signal V1 for switching to the parking range, under a condition that the first vehicle speed signal V1 is normal. For suppressing the occurrence of a difficulty of executing the parking lock in response to the parking lock demand, a determination may be conceivably executed using only the second vehicle speed signal V2 for switching to the parking range, under a condition that the first vehicle speed signal V1 is abnormal. Accordingly, in a vehicle-speed determination on the second vehicle speed signal V2, not the V2-parking-lock allowable vehicle speed (A+α) obtained by correcting the V1-parking-lock allowable vehicle speed A, but the V1-parking-lock allowable vehicle speed A is used as it is as a predetermined vehicle-speed threshold value.

Figure 10:
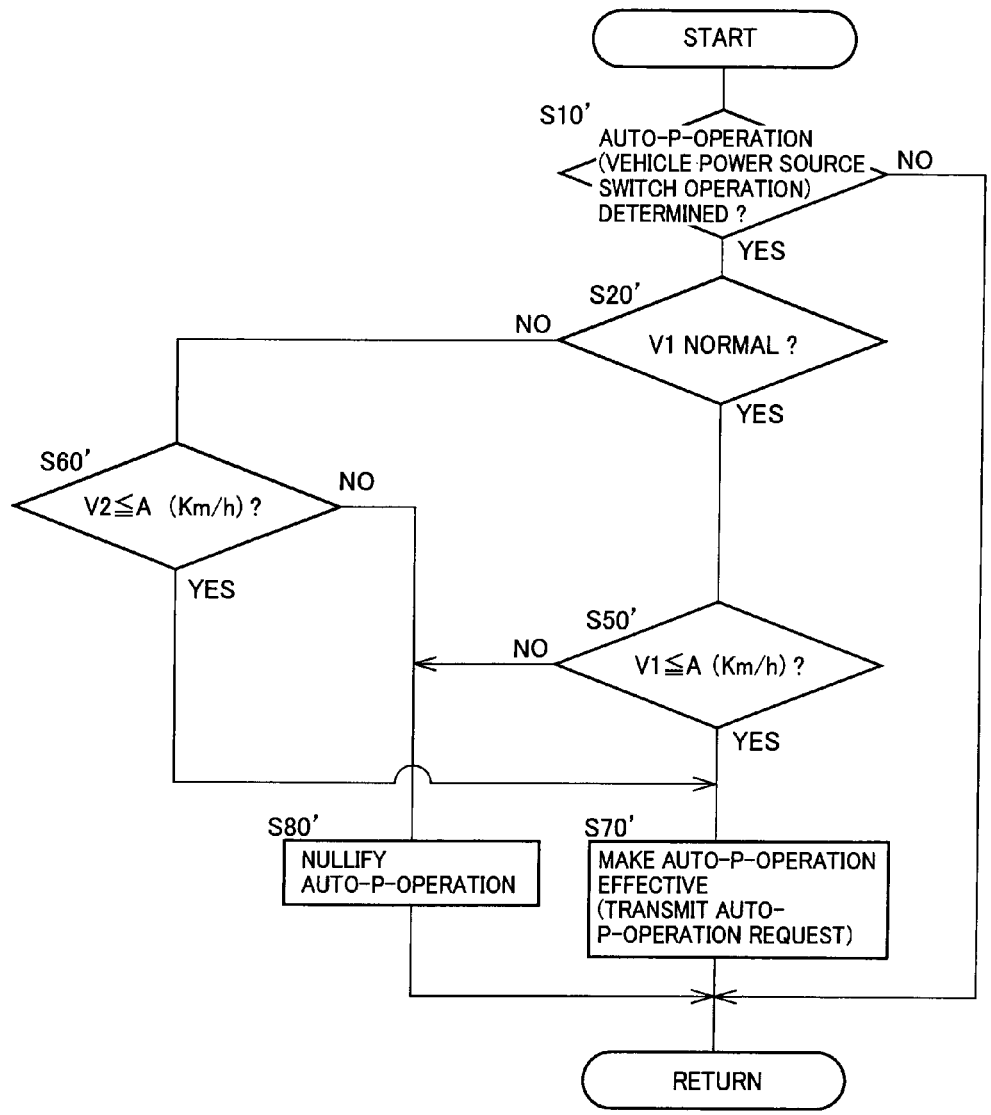
FIG. 10 is a flowchart representing another embodiment to illustrate a major part of control operations of the electronic control section, i.e., a series of control operations in which with utilizing a determination for switching to a parking range with increased precision by a first vehicle speed signal having the quicker response, the occurrence of a difficulty in executing a parking lock in response to a parking lock demand by a second vehicle speed signal having the slower response is suppressed.

FIG. 10 is a flowchart illustrating a major part of control operations to be executed by the electronic control section 20. That is, FIG. 10 shows a sequence of control operations with utilizing the switching determination with increased precision to the parking range by using the first vehicle speed signal having quicker response, the occurrence of a difficulty of executing the parking lock in response to the parking lock demand on using the second vehicle speed signal V2 having the slower response can be suppressed. This sequence is repeatedly executed for an extremely short cycle time in the order of for instance several milliseconds or several tens milliseconds.

First, at S10' corresponding to the P-operation request determining means 100, as to whether the driver has performed the predetermined operation for switching to the parking range is determined. For instance, when the shift range of the transmission 40 remains in the non-P-range with the vehicle power source remained turned on, depression of the vehicle power source switch 80 by operation of the driver is determined based on the power switching signal delivered from the vehicle power source switch 80. That is, as to whether the driver has performed the operation to execute the auto-P operation is determined. If the determination at S10' is negative, then, the current routine is terminated. If the determination at S10' is positive, then, at S20' corresponding to the vehicle speed signal normality determining means 102, as to whether the first vehicle speed signal is normal is determined based on for instance whether the first vehicle speed signal V1 is applied to the PM-ECU 22. If the determination at S20' is positive, then, at S50' corresponding to the vehicle speed determining means 106, as to whether the first vehicle speed signal V1 is less than the V1-parking-lock allowable vehicle speed A is determined. On the contrary, if the determination at S20' is negative, then, at S60' also corresponding to the vehicle speed determining means 106, as to whether the second vehicle speed signal V2 is less than the V1-parking-lock allowable vehicle speed A is determined.

If the determination at S50' is positive or the determination at S60' is positive, then, at S70' corresponding to the P-range switching control means 108, the predetermined operation performed by the driver for switching to the parking range is made effective. Subsequently, the shift range is switched from the non-P-range to the P-range in the transmission 40, upon which a drive of the parking lock device 50 is controlled to operate the parking lock in response to the predetermined operation. If the predetermined operation performed by the driver determined at S10' as described above is the operation for executing the auto-P operation, for instance, such an operation for the auto-P operation is made effective. In addition to the switching of the shift range to the P-range, the vehicle power source TURN-ON is switched to the vehicle power source TURN-OFF.

On the contrary, if the determination at S50' or the determination at S60' are negative, then, at S80' also corresponding to the P-range switching control means 108, the predetermined operation performed by the driver for switching to the parking range is nullified, and no switching to the parking range is executed. That is, no parking range is executed in response to the predetermined operation. For instance, if the predetermined operation performed by the driver as determined at S10' is the operation for executing the auto-P operation, such an operation for the auto-P operation is nullified.

As set forth above, in accordance with the present embodiment, the switching to the parking range is determined, based on only the first vehicle speed signal V1 when the first vehicle speed signal V1 having the quicker response is normal, whereas based on only the second vehicle speed signal V2 having the slower response in comparison to the first vehicle speed signal V1 when the first vehicle speed signal V1 is abnormal. Accordingly, during an electric switching control to the parking range in the transmission 40 to execute the parking lock in response to the operation of the driver, the switching determination to the parking range with increased precision is surely utilized by using the first vehicle speed signal V1 having the quicker response. In addition, by using the second vehicle speed signal V2 having the slower response upon a failure in the first vehicle speed signal V1, the occurrence of a difficulty of executing the parking lock in response to the parking lock demand is suppressed.

In the foregoing, although the embodiments according to the present invention have been described in detail with reference to the accompanying drawings, the present invention may be applied in other various modes.

In the embodiment set forth above, for instance, the electronic control section 20 determines the switching to the parking range by using the V2-parking-lock allowable vehicle speed (A+α) obtained by correcting the V1-parking-lock allowable vehicle speed A associated with the first vehicle speed signal V1, such that the slower the response of the second vehicle signal V2 having a slower response is, the larger will be the corrected value than the corrected value associated with the first vehicle speed signal V1 having the quicker response. However, the switching to the parking range may be determined using a corrected value obtained by correcting the second vehicle speed signal V2 per se having the slower response, such that a difference in vehicle speed between the second vehicle speed signal V2 having the slower response and the first vehicle speed signal V1 having the quicker response is suppressed. For instance, the electronic control section 20 may determine the switching to the parking range based on whether a corrected value (V2−α) of the second vehicle speed signal V2 per se obtained by subtracting the corrected value "α" from the second vehicle speed signal V2, falls not more the predetermined vehicle speed threshold value (V1-parking-lock allowable vehicle speed A). Such a determination renders the same advantageous effects as those of the embodiment previously mentioned above.

In the illustrated embodiment, moreover, if the first vehicle speed signal V1 having the quicker response is abnormal, the electronic control section 20 does not correct to make the V1-parking-lock allowable vehicle speed A as the V2-parking-lock allowable vehicle speed (A+α) on using the second vehicle speed signal V2. Instead of such operation, however, the corrected value "α" in the correction may be suppressed. In this case, the corrected value "α" is set such that occurrence determination for switching to the parking range during the deceleration with no vehicle speed V satisfying the predetermined condition V' is avoided.

In the illustrated embodiment, moreover, although both the first vehicle speed signal V1 and the second vehicle speed signal V2 are based on the wheel-velocity pulse signal output from the wheel velocity sensor 86, these signals may be based on pulse signals output from other rotation speed sensors such as the output rotation sensor 82 and the motor rotation sensor (resolver) 84. In addition, the first vehicle speed signal V1 and the second vehicle speed signal V2 may be based on the pulse signals detected by different rotation speed sensors, which can further increase reliability of the vehicle speed signals. Besides, the number of vehicle speed signals are not limited to the two vehicle speed signals such as the first vehicle speed signal V1 and the second vehicle speed signal V2, and may be more than three signals. That is, the present invention can be applied to the case where at least more than two vehicle speed signals different in response are determined (used).

In the illustrated embodiment, further, the second vehicle speed signal V2 is the meter display vehicle speed signal V, determined with the operation of the Meter-ECU 28 counting (counting the number of) the square waves of the vehicle speed pulse signal output from the skid control ECU 27, which is output to the PM-ECU 22 via the direct connection line. However, the second vehicle speed signal V2 may be a vehicle speed signal output to the PM-ECU 22, before counted by the Meter-ECU 28 via the direct connection line so that the square waves of the vehicle speed signal is counted by the PM-ECU 22.

In the illustrated embodiment, furthermore, although the shift lever 32 may be the type that is two-dimensionally shifted in operation, the shift lever 32 may be a type that can be operatively shifted along a single shaft or may be a type that is three-dimensionally shifted in operation.

In the illustrated embodiment, moreover, although the position sensors for detecting the position of the shift lever 32 includes the shift sensor 36 and the select sensor 38, the number of the position sensors may not be limited to two.

Further, the shift lever 32 of the illustrated embodiment described above is the momentary type lever switch operatively shifted to the shift positions $P_{SH}$ of plural kinds. Instead for such switch, the shift lever 32 may be for instance a pushbutton type switch or a slide type switch or the like. Further, the shift operation device 30 may be a type which is not operated manually but is operated by a foot, or is operated in response to a voice of the driver. In addition, although the shift lever 32 is provided separately from the P-switch 34, the shift lever 32 can be provided with a parking position to have a function of the P-switch 34. Moreover, the shift lever 32 may not be of the momentary type including the P-switch 34. The present invention can be applied in such an arrangement.

It is intended that the present invention described be considered only as illustrative of one embodiment, and that the present invention may be implemented in various modifications and improvements based on knowledge of those skilled in the art.

The invention claimed is:

1. A shifting control device for vehicle for electrically controlling a switching of a transmission to a parking range for performing a parking lock in response to an operation by a driver, the shifting control device for vehicle configured to determine the switching to the parking range when the driver performs a predetermined operation for switching to the parking range, based on whether plural vehicle speed signals different in response relative to an actual vehicle speed satisfy a predetermined condition; and the switching to the parking range being determined (i) using a corrected value obtained by correcting a vehicle speed signal having a slower response such that a difference in a vehicle speed based on the vehicle speed signal having the slower response and a vehicle speed signal having a quicker response is suppressed, or (ii) using a corrected value obtained by correcting a predetermined vehicle-speed threshold value associated with the vehicle speed signal having the quicker response such that the slower the response of the vehicle signal having a slower response is, the larger is the corrected value than the corrected value associated with the vehicle speed signal having the quicker response.

2. The shifting control device for vehicle according to claim 1, wherein the corrected value is determined, based on a delay component in response of the vehicle speed signal having the slower response relative to the actual vehicle speed, such that the slower the response of the vehicle speed signal having the slower response is, the more easily the predetermined condition is satisfied than the vehicle speed signal having the quicker response.

3. The shifting control device for vehicle according to claim 2, wherein the corrected amounts by the corrections are made larger for a larger deceleration of a vehicle in comparison to a smaller deceleration of the vehicle.

4. The shifting control device for vehicle according to claim 3, wherein when the vehicle speed signal having the quicker response is abnormal, the switching to the parking range is determined with suppressing the corrected amounts by the corrections and without using the abnormal vehicle speed signal.

5. The shifting control device for vehicle according to claim 3, wherein when the vehicle speed signal having the quicker response is abnormal, the switching to the parking range is determined without performing the corrections and without using the abnormal vehicle speed signal.

6. The shifting control device for vehicle according to claim 2, wherein when the vehicle speed signal having the quicker response is abnormal, the switching to the parking range is determined with suppressing the corrected amounts by the corrections and without using the abnormal vehicle speed signal.

7. The shifting control device for vehicle according to claim 2, wherein when the vehicle speed signal having the quicker response is abnormal, the switching to the parking range is determined without performing the corrections and without using the abnormal vehicle speed signal.

8. The shifting control device for vehicle according to claim 1, wherein the corrected amounts by the corrections are made larger for a larger deceleration of a vehicle in comparison to a smaller deceleration of the vehicle.

9. The shifting control device for vehicle according to claim 8, wherein when the vehicle speed signal having the quicker response is abnormal, the switching to the parking range is determined with suppressing the corrected amounts by the corrections and without using the abnormal vehicle speed signal.

10. The shifting control device for vehicle according to claim 8, wherein when the vehicle speed signal having the quicker response is abnormal, the switching to the parking range is determined without performing the corrections and without using the abnormal vehicle speed signal.

11. The shifting control device for vehicle according to claim 1, wherein when the vehicle speed signal having the quicker response is abnormal, the switching to the parking range is determined with suppressing the corrected amounts by the corrections and without using the abnormal vehicle speed signal.

12. The shifting control device for vehicle according to claim 1, wherein when the vehicle speed signal having the quicker response is abnormal, the switching to the parking range is determined without performing the corrections and without using the abnormal vehicle speed signal.

13. The shifting control device for vehicle according to claim 1, wherein one of the vehicle speed signals is based on a pulse signal obtained by converting a vehicle-speed correlation value detected by a rotation speed sensor.

14. The shifting control device for vehicle according to claim 1, wherein the vehicle speed signals are based on vehicle-speed correlation values detected by different rotation speed sensors.

15. The shifting control device for vehicle according to claim 1, wherein:
the predetermined condition is a determining condition for determining whether a vehicle is halted based on the vehicle speed signals; and
on performing the predetermined operation for switching to the parking range of the driver, if the predetermined condition is satisfied with the vehicle speed signals falling not more than or being less than the predetermined vehicle-speed threshold value, the switching to the parking range is determined.

16. The shifting control device for vehicle according to claim 1, further including a function to execute switching from a shift range other than the parking range to the parking range and to turn off a vehicle power source, in response to the operation by the driver for switching the vehicle power source from a turn-on state to a turn-off state,
wherein the predetermined operation performed by the driver for switching to the parking range is an operation for switching the vehicle power source from the turn-on state to the turn-off state.

17. The shifting control device for vehicle according to claim 1, wherein:
the switching of the shift range of the transmission is electrically controlled based on a positional signal about an operated position of a shift operation device; and
the predetermined operation performed by the driver for switching to the parking range is an operation of the shift operation device to switch to the operated position for switching the shift range to the parking range in the transmission.

18. A shifting control device for vehicle for electrically controlling a switching of a transmission to a parking range for performing a parking lock in response to an operation by a driver,
the shifting control device for vehicle configured to determine, when the driver performs a predetermined operation for switching to the parking range, the switching to the parking range based on whether a vehicle speed signal including plural vehicle speed signals different in response relative to an actual vehicle speed satisfies a predetermined condition; and
the switching to the parking range being determined, based on only the vehicle speed signal having the quicker response when the vehicle speed signal having the quicker response is normal, whereas based on only the vehicle speed signal having the slower response in comparison to the vehicle speed signal having the quicker response when the vehicle speed signal having the quicker response is abnormal.

19. The shifting control device for vehicle according to claim 18, wherein one of the vehicle speed signals is based on a pulse signal obtained by converting a vehicle-speed correlation value detected by a rotation speed sensor.

20. The shifting control device for vehicle according to claim 18, wherein the vehicle speed signals are based on vehicle-speed correlation values detected by different rotation speed sensors.

\* \* \* \* \*